(No Model.)
C. S. SHARP.
DISK HARROW.
No. 513,287. Patented Jan. 23, 1894.
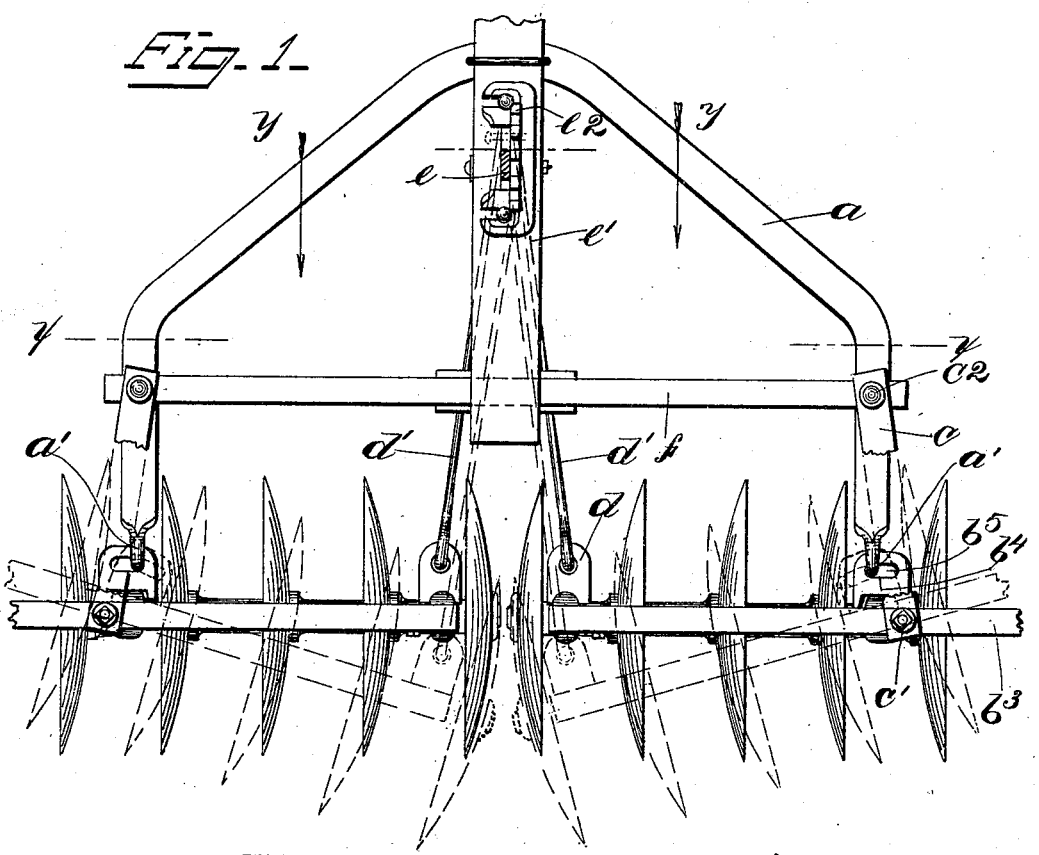
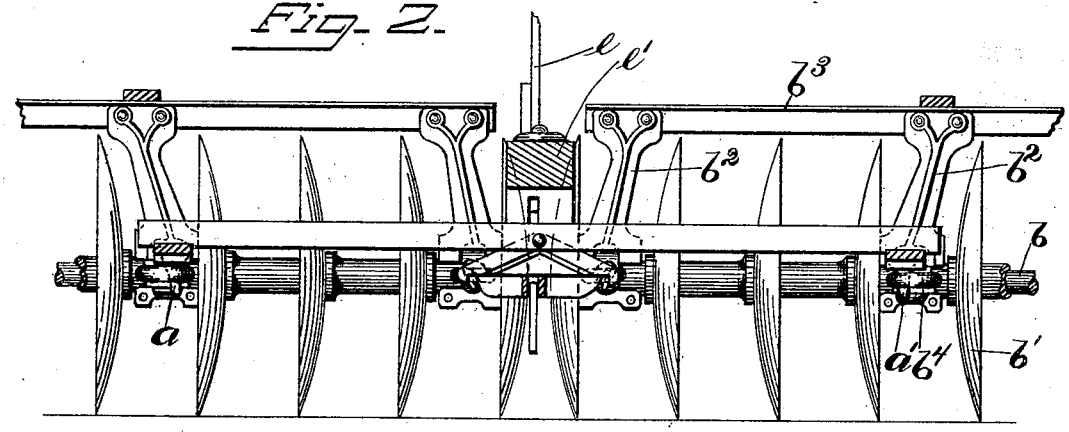
WITNESSES
F. C. Noyes.
Charles B. Crocker.
INVENTOR
Charles S. Sharp,
By D. J. Noyes,
atty.

UNITED STATES PATENT OFFICE.

CHARLES S. SHARP, OF AUBURN, NEW YORK, ASSIGNOR TO THE D. M. OSBORNE & COMPANY, OF SAME PLACE.

DISK HARROW.

SPECIFICATION forming part of Letters Patent No. 513,287, dated January 23, 1894.

Application filed August 28, 1893. Serial No. 484,189. (No model.)

*To all whom it may concern:*

Be it known that I, CHARLES S. SHARP, a citizen of the United States, and a resident of Auburn, county of Cayuga, State of New York, have invented an Improvement in Disk Harrows, of which the following description, in connection with the accompanying drawings, is a specification, like letters on the drawings representing like parts.

This invention has for its object to improve the construction of that class of harrows wherein two gangs of disks are pivotally or loosely connected to a draft frame. In accordance with this invention the draft frame is made rigid, and provided with hooked ends, and the disk gangs have secured to their shafts at points midway between their ends, slotted lugs which are engaged by said hooked ends, the slots therein permitting and also limiting endwise movement of said disk gangs when they are turned by their adjusting devices angularly with relation to each other in a horizontal plane, and the harrow is drawn forward. The adjusting device for angularly adjusting the disk gangs consists of two rods or bars connected at their rear ends to the adjacent inner ends of the disk gangs, and at their forward ends to an operating bar or lever, provided as usual with a spring actuated latch adapted to engage a quadrant. A saddle or cross piece is pivotally or otherwise supported intermediate the disk gangs in such a manner that the upward thrust of the inner end of either gang is resisted by or imparted reversely to the other gang. As herein shown this saddle is pivotally supported above and so as to act directly upon the adjusting rods or bars, thereby indirectly acting upon the disk gangs, such arrangement of parts being preferred to permit angular adjustment of the disk gangs with relation to each other without disarranging the co-operative relation of the saddle or cross piece, as would be the case if said saddle or cross piece acted directly upon the disk gangs.

Figure 1, shows in plan view a portion of a disk harrow embodying this invention; Fig. 2, a cross section of the harrow shown in Fig. 1, taken on the dotted lines $x$—$x$ looking in the direction of the arrows $y$, and Fig. 3, a detail to be referred to.

The draft frame $a$, is made bow-shape as shown in Fig. 1, and provided at its rear extremities with hooks $a'$.

The disk gangs each consist of a shaft or axle $b$ having mounted thereon a series of concave disks $b'$, and vertical standards or supports $b^2$, are erected upon said shaft or axle, or otherwise supported, which furnish a support for the bar $b^3$ extending horizontally parallel with said shaft or axle to which the clearers may be secured. Midway between the ends of each disk gang, a lug or ear $b^4$ is bolted to the shaft or axle, projecting forward and having a transverse or substantially horizontal slot $b^5$, said slots receiving the hooked ends $a'$ of the draft frame, thereby loosely connecting said disk gangs with the draft frame. These slots $b^5$ are made of sufficient length to permit a limited endwise movement of the disk gangs. To additionally support the disk gangs short connecting bars $c$ are pivotally connected at their rear ends to the bars $b^3$, as by bolt $c'$ and at their forward ends to the draft frame, as by bolts, $c^2$.

At or near the inner or adjacent ends of the disk gangs lugs or ears $d$ are bolted or otherwise secured to the shaft or axle $b$ having holes through them, and adjusting rods or bars $d'$ having hooked ends adapted to enter said holes, extend forward and are connected loosely at their forward ends to the lower end of an operating lever $e$, pivotally supported in the pole $e'$, and provided with any usual or suitable latch, not shown, adapted to engage the quadrant $e^2$. By moving said operating lever $e$, the adjacent ends of the disk gangs may be angularly adjusted with relation to each other, or in other words, the disk gangs are thereby caused to swing on a vertical axis, and when so adjusted and the harrow is drawn forward, the slotted lugs $b^4$ permit a limited endwise movement of said disk gangs.

A cross bar $f$ is secured to the draft frame $a$, which is herein shown as made of channel iron within which is pivotally connected at a point between its ends, and hence between but above the adjusting rods or bars $d'$, $d'$, a saddle or cross piece $g$, preferably having angularly projecting ends $g'$, and also preferably having formed upon one, or it may be both sides, a rib $g^2$, which is adapted to strike against the lower edge of the channel bar $f$, as said rocking saddle is moved in one or the other direction, a predetermined distance, thereby limiting its movement. This rocking saddle bears upon, or is located just above the adjusting rods or bars $d'$, $d'$, so that in case the inner end of one of the disk gangs should rise, said adjusting rod or bar $d'$ connected thereto, will be brought to bear against one end or arm of the saddle $g$, turning it on its pivot, while the opposite end or arm of said saddle bears heavily upon the other adjusting rod or bar. Thus it will be seen that while the adjacent or inner ends of said disk gangs have an independent vertical movement relative to each other, each are held down by the other, or in other words, the upward thrust of the inner end of either gang is resisted by the other gang, being imparted reversely thereto through the intermediate rocking saddle.

I do not desire to limit my invention to the particular construction of saddle herein shown, nor to the particular way of supporting it, nor to so arranging it that it shall bear upon the adjusting rods $d'$, $d'$, as it may be otherwise arranged so as to accomplish the same result viz: to allow adjustment of the disk gangs in a horizontal plane, and also allow each an independent movement, with relation to the other, yet holding the inner or adjacent ends of each down by acting upon the other. It is also obvious that instead of providing the lugs $b^4$ with transverse slots, and the extremities of the draft frame with hooks, the lugs may be provided with hooks and the extremities of the draft frame with transverse slots, the result being in either case the same or substantially so.

I claim—

1. In a disk harrow, the draft frame having hooks $a'$ at its extremities, combined with two disk gangs, each having a lug $b^4$, projecting forward midway between its ends and provided with a transverse slot $b^5$ to receive the hooks $a'$ of the draft frame, said slots permitting and also limiting endwise movement of the disk gangs.

2. In a disk harrow, the combination of the draft frame $a$, and recessed cross bar $f$, connected at the ends to said draft frame, and two disk gangs pivotally connected to said draft frame $a$, and adjusting rods connected with the adjacent ends of said disk gangs, for moving them angularly with relation to each other, and means for moving said adjusting rods, the saddle $g$, pivotally connected to the cross bar $f$, and working in the recess thereof, above and bearing upon said adjusting rods, to resist the upward movement of the inner end of either gang, substantially as described.

3. In a disk harrow, the combination of the draft frame $a$, recessed cross bar $f$, connected at the ends to said draft frame, two independent disk gangs pivotally connected to said draft frame, the saddle $g$ provided with angularly projecting ends $g'$, pivotally connected to the cross bar $f$, and working in the recess thereof above and bearing upon the adjusting rods, said ends $g'$ operating to keep the saddle in position upon said rods, susbtantially as described.

4. In a disk harrow, the draft frame, and two independent disk gangs pivotally connected thereto, combined with a saddle $g$, provided with a rib $g^2$, and pivotally supported by a cross bar above the adjusting rods or bars, adapted to bear thereon, and resist the upward movement of the inner end of either gang.

In testimony whereof I have signed my name to this specification in the presence of two subscribing witnesses.

CHARLES S. SHARP.

Witnesses:
W. H. HARRIS,
GEO. E. CRONKRIGHT.